US011968222B2

(12) United States Patent
Zan et al.

(10) Patent No.: US 11,968,222 B2
(45) Date of Patent: Apr. 23, 2024

(54) SUPPLY CHAIN ATTACK DETECTION

(71) Applicant: PALO ALTO NETWORKS (ISRAEL ANALYTICS) LTD., Tel Aviv (IL)

(72) Inventors: Yuval Zan, Givatayim (IL); Erez Levy, Ganey Tikva (IL); Dor Agron, Ramat Hasharon (IL); Yarom Dadon, Tel Aviv (IL); Chen Evgi, Lod (IL)

(73) Assignee: PALO ALTO NETWORKS (ISRAEL ANALYTICS) LTD., Tel Aviv (IL)

( * ) Notice: Subject to any disclaimer, the term of this patent is extended or adjusted under 35 U.S.C. 154(b) by 93 days.

(21) Appl. No.: 17/857,196

(22) Filed: Jul. 5, 2022

(65) Prior Publication Data

US 2024/0015172 A1    Jan. 11, 2024

(51) Int. Cl.
*H04L 29/06*     (2006.01)
*H04L 9/40*      (2022.01)
*H04L 41/0681*   (2022.01)

(52) U.S. Cl.
CPC ...... *H04L 63/1425* (2013.01); *H04L 41/0681* (2013.01)

(58) Field of Classification Search
CPC .......... H04L 63/1425; H04L 41/0681
See application file for complete search history.

(56) References Cited

U.S. PATENT DOCUMENTS

| 8,245,304 | B1 | 8/2012 | Chen et al. |
| 8,555,388 | B1 | 10/2013 | Wang et al. |
| 8,561,188 | B1 | 10/2013 | Wang et al. |
| 8,677,487 | B2 | 3/2014 | Balupari et al. |
| 8,826,434 | B2 | 9/2014 | Merza |
| 8,955,114 | B2 * | 2/2015 | Dolan-Gavitt ........ G06F 21/577 726/22 |
| 8,966,625 | B1 | 2/2015 | Zuk et al. |
| 9,038,178 | B1 | 5/2015 | Lin et al. |
| 9,130,982 | B2 | 9/2015 | Gottlieb et al. |
| 9,147,071 | B2 | 9/2015 | Sallam |
| 9,154,516 | B1 | 10/2015 | Vaystikh et al. |
| 9,215,239 | B1 | 12/2015 | Wang et al. |

(Continued)

OTHER PUBLICATIONS

Palo Alto Networks, "Cortex Xsoar—Phishing Investigation—Generic v2," pp. 1-6, year 2020, as downloaded from https://web.archive.org/web/20200927223050/https://xsoar.pan.dev/docs/reference/playbooks/phishing-investigation-generic-v2.

(Continued)

*Primary Examiner* — Ka Shan Choy
(74) *Attorney, Agent, or Firm* — KLIGLER & ASSOCIATES PATENT ATTORNEYS LTD.

(57) ABSTRACT

Methods, storage systems and computer program products implement embodiments of the present invention that include identifying multiple host computers executing respective instances of a specific software application, each given instance on each given host computer including a set of program instructions loaded, by the host computer, from a respective storage device. Information on actions performed by the executing instances is collected from the host computers, and features are computed based on the information collected from the multiple host computers. The collected information for a given instance are compared to the features so as to classify the given instance as benign or suspicious, and an alert s generated for the given instance only upon classifying the given instance as suspicious.

28 Claims, 6 Drawing Sheets

(56) References Cited

U.S. PATENT DOCUMENTS

| | | | |
|---|---|---|---|
| 9,342,691 B2 | 5/2016 | Maestas | |
| 9,378,361 B1 | 6/2016 | Yen et al. | |
| 9,386,028 B2 | 7/2016 | Altman | |
| 9,462,008 B2 | 10/2016 | Bartos et al. | |
| 9,998,484 B1 | 6/2018 | Buyukkayhan et al. | |
| 10,148,690 B2 | 12/2018 | Shen et al. | |
| 10,257,295 B1 | 4/2019 | Alpert et al. | |
| 10,425,436 B2 | 9/2019 | Firstenberg et al. | |
| 10,587,647 B1* | 3/2020 | Khalid | H04L 63/1416 |
| 10,601,866 B2 | 3/2020 | Bartik et al. | |
| 10,574,681 B2 | 12/2020 | Meshi et al. | |
| 2003/0110379 A1 | 6/2003 | Ylonen et al. | |
| 2007/0064617 A1 | 3/2007 | Reves | |
| 2007/0143852 A1 | 6/2007 | Keanini et al. | |
| 2008/0082662 A1 | 4/2008 | Dandliker et al. | |
| 2008/0256622 A1 | 10/2008 | Neystadt et al. | |
| 2009/0119397 A1 | 5/2009 | Neerdaels | |
| 2011/0016525 A1 | 1/2011 | Jeong et al. | |
| 2011/0185429 A1* | 7/2011 | Sallam | G06F 21/562 726/24 |
| 2011/0239300 A1 | 9/2011 | Klein et al. | |
| 2011/0283357 A1 | 11/2011 | Pandrangi et al. | |
| 2011/0302656 A1 | 12/2011 | El-Moussa | |
| 2012/0158626 A1 | 6/2012 | Zhu et al. | |
| 2013/0007233 A1 | 1/2013 | Lv et al. | |
| 2013/0031625 A1 | 1/2013 | Lim | |
| 2014/0007238 A1 | 1/2014 | Magee et al. | |
| 2014/0165207 A1 | 6/2014 | Engel et al. | |
| 2014/0181973 A1 | 6/2014 | Lee et al. | |
| 2015/0128263 A1 | 5/2015 | Raugas et al. | |
| 2015/0170072 A1 | 6/2015 | Grant et al. | |
| 2015/0172300 A1 | 6/2015 | Cochenour | |
| 2015/0358344 A1 | 12/2015 | Mumcuoglu et al. | |
| 2015/0373039 A1 | 12/2015 | Wang | |
| 2015/0373043 A1 | 12/2015 | Wang et al. | |
| 2016/0042287 A1 | 2/2016 | Eldardiry et al. | |
| 2016/0057165 A1 | 2/2016 | Thakar et al. | |
| 2016/0099852 A1 | 4/2016 | Cook et al. | |
| 2016/0104203 A1 | 4/2016 | Roosenraad et al. | |
| 2016/0134651 A1 | 5/2016 | Hu et al. | |
| 2016/0150004 A1 | 5/2016 | Hentunen | |
| 2016/0156655 A1 | 6/2016 | Lotem et al. | |
| 2016/0234167 A1 | 8/2016 | Engel et al. | |
| 2016/0294773 A1 | 10/2016 | Yu et al. | |
| 2016/0352772 A1 | 12/2016 | O'Connor | |
| 2016/0366159 A1 | 12/2016 | Chiba et al. | |
| 2017/0026398 A1 | 1/2017 | Mumcuoglu et al. | |
| 2017/0041333 A1 | 2/2017 | Mahjoub et al. | |
| 2017/0098086 A1* | 4/2017 | Hoernecke | G06F 11/3688 |
| 2017/0123875 A1* | 5/2017 | Craik | G06F 21/50 |
| 2017/0126718 A1 | 5/2017 | Baradaran et al. | |
| 2017/0149807 A1* | 5/2017 | Schilling | G06F 21/53 |
| 2018/0013778 A1 | 1/2018 | Lim et al. | |
| 2018/0139224 A1 | 5/2018 | Amell et al. | |
| 2018/0288073 A1 | 10/2018 | Hopper | |
| 2018/0351930 A1 | 12/2018 | Kim et al. | |
| 2019/0007440 A1 | 1/2019 | Lavi et al. | |
| 2019/0081952 A1 | 3/2019 | Wood | |
| 2019/0190931 A1 | 6/2019 | Levin et al. | |
| 2019/0250911 A1 | 8/2019 | Lospinuso et al. | |
| 2019/0319981 A1 | 10/2019 | Meshi et al. | |
| 2019/0372934 A1* | 12/2019 | Yehudai | G06F 18/2321 |
| 2019/0387005 A1 | 12/2019 | Zawoad et al. | |
| 2020/0007548 A1 | 1/2020 | Sanghavi et al. | |
| 2020/0014714 A1 | 1/2020 | Mortensen et al. | |
| 2020/0177625 A1 | 6/2020 | Rouvinen | |
| 2020/0213333 A1 | 7/2020 | Deutschmann et al. | |
| 2020/0233791 A1* | 7/2020 | Manzano | G06F 11/3684 |
| 2020/0244658 A1 | 7/2020 | Meshi et al. | |
| 2021/0014198 A1 | 1/2021 | Amoudi et al. | |
| 2021/0136037 A1 | 5/2021 | Balasubramaniam | |
| 2021/0258325 A1 | 8/2021 | Meyer et al. | |
| 2021/0266331 A1 | 8/2021 | Meshi et al. | |
| 2022/0006819 A1 | 1/2022 | Allon et al. | |

OTHER PUBLICATIONS

GitHub, cburgmer/rasterizeHTML.js, pp. 1-2, Jan. 19, 2020, as downloaded from https://web.archive.org/web/20200219074432/https://github.com/cburgmer/rasterizeHTML.js.

Refsnes Data, "W3Schools, -HTML <form> Tag," pp. 1-10, years 1999-2023, as downloaded from https://www.w3schools.com/tags/tag_form.asp.

Refsnes Data, "W3Schools, -HTML <input> Tag," pp. 1-11, years 1999-2023, as downloaded from https://www.w3schools.com/tags/tag_input.asp.

Microsoft 365, "Exchange—Work Smarter with Business-Class Email and Calendaring," pp. 1-4, Aug. 15, 2020, as downloaded from https://web.archive.org/web/20200815211502/https://www.microsoft.com/en-ww/microsoft-365/exchange/email.

Wikipedia, "Selenium (Software)," pp. 1-5, last edited Dec. 3, 2019, as downloaded from https://web.archive.org/web/20191218132058/https://en.wikipedia.org/wiki/Selenium_(software).

Wikipedia, "WhoIs," pp. 1-16, last edited Dec. 23, 2019, as downloaded from https://web.archive.org/web/20200112181104/https://en.wikipedia.org/wiki/WHOIS.

"British National Corpus," Oxford Text Archive, IT Services, University of Oxford, p. 1-1, year 2015, as downloaded from https://web.archive.org/web/20200128044646/http://www.natcorp.ox.ac.uk/.

Wei et al., "Identifying New Spam Domains by Hosting IPS: Improving Domain Blacklisting", Dept. of Computer and Information Sciences, University of Alabama at Birmingham, pp. 1-8, Jan. 2010.

Iana., "Autonomous System (AS) Numbers", 1 page, Jul. 29, 2016.

Gross et al., "FIRE: Finding Rogue nEtworks", Annual Conference on Computer Security Applications, pp. 1-10, Dec. 7-11, 2009.

Frosch., "Mining DNS-related Data for Suspicious Features", Ruhr Universitat Bochum, Master's Thesis, pp. 1-88, Dec. 23, 2011.

Bilge et at., "Disclosure: Detecting Botnet Command and Control Servers Through Large-Scale NetFlow Analysis", Annual Conference on Computer Security Applications, pp. 1-10, Dec. 3-7, 2012.

Blum., "Combining Labeled and Unlabeled Data with Co-Training", Carnegie Mellon University, Research Showcase @ CMU, Computer Science Department, pp. 1-11, Jul. 1998.

Felegyhazi et al., "On the Potential of Proactive Domain Blacklisting", LEET'10 Proceedings of the 3rd USENIX Conference on Large-scale exploits and emergent threats, pp. 1-8, San Jose, USA, Apr. 27, 2010.

Konte et al., "ASwatch: An AS Reputation System to Expose Bulletproof Hosting ASes", SIGCOMM, pp. 625-638, Aug. 17-21, 2015.

Markowitz, N., "Bullet Proof Hosting: A Theoretical Model", Security Week, pp. 1-5, Jun. 29, 2010, downloaded from http://www.infosecisland.com/blogview/4487-Bullet-Proof-Hosting-A-Theoretical-Model.html.

Markowitz, N., "Patterns of Use and Abuse with IP Addresses", Security Week, pp. 1-4, Jul. 10, 2010, downloaded from http://infosecisland.com/blogview/5068-Patterns-of-Use-and-Abuse-with-IP-Addresses.html.

Goncharov,M., "Criminal Hideouts for Lease: Bulletproof Hosting Services", Forward-Looking Threat Research (FTR) Team, A TrendLabsSM Research Paper, pp. 1-28, Jul. 3, 2015.

Bilge at al., "Exposure: Finding Malicious Domains Using Passive DNS Analysis", NDSS Symposium, pp. 1-17 Feb. 6-9, 2011.

Xu et al., "We know it before you do: Predicting Malicious Domains", Virus Bulletin Conference, pp. 73-33, Sep. 2014.

Palo Alto Networks, "Cortex XDR", p. 1-7, year 2020.

"GeoIP Databases & Services: Industry Leading IP Intelligence," MaxMind, Inc., pp. 1-3, updated Jan. 14, 2022, as downloaded from https://www.maxmind.com/en/geoip2-services-and-databases.

Alon et al., U.S. Appl. No. 17/844,097, filed Jun. 20, 2022.

U.S. Appl. No. 16/789,442 Office Action dated Aug. 18, 2022.

U.S. Appl. No. 16/798,466 Office Action dated Aug. 25, 2022.

Mandiant, "Highly Evasive Attacker Leverages SolarWinds Supply Chain to Compromise Multiple Global Victims with Sunburst Backdoor", pp. 1-16, Dec. 13, 2020 downloaded from https://www.

(56) References Cited

OTHER PUBLICATIONS mandiant.com/resources/blog/evasive-attacker-leverages-solarwinds-supply-chain-compromises-with-sunburst-backdoor.
International Applicaton PCT/IB2023/056071 Search Report dated Sep. 22, 2023.
U.S. Appl. No. 16/798,466 Office Action dated Jan. 19, 2023.

* cited by examiner

SUPPLY CHAIN ATTACK DETECTION

FIELD OF THE INVENTION

The present invention relates generally to computer security and networks, and particularly detecting anomalous actions performed by a given instance of a software application deployed on multiple host computers in multiple enterprises.

BACKGROUND OF THE INVENTION

In many computers and network systems, multiple layers of security apparatus and software are deployed in order to detect and repel the ever-growing range of security threats. At the most basic level, computers use anti-virus software to prevent malicious software from running on the computer. At the network level, intrusion detection and prevention systems analyze and control network traffic to detect and prevent malware from spreading through the network.

The description above is presented as a general overview of related art in this field and should not be construed as an admission that any of the information it contains constitutes prior art against the present patent application.

SUMMARY OF THE INVENTION

There is provided, in accordance with an embodiment of the present invention, a method including identifying multiple host computers executing respective instances of a specific software application, each given instance on each given host computer including a set of program instructions loaded, by the host computer, from a respective storage device, collecting, from the host computers, information on actions performed by the executing instances, computing features based on the information collected from the multiple host computers, comparing, by a processor, the collected information for a given instance to the features so as to classify the given instance as benign or suspicious, and generating an alert for the given instance only upon classifying the given instance as suspicious.

In some embodiments, the information includes action types and entities.

In a first information embodiment, the action type for a given action includes creating or injecting a process, and the entity for the given action includes a process having a process name.

In a second information embodiment, the action type for a given action includes accessing a domain, and the entity for the given action includes a domain name.

In a third information embodiment, the action type for a given action includes accessing an Internet Protocol (IP) address, and the entity for the given action includes an IP address.

In a fourth information embodiment, the action type for a given action includes accessing an autonomous system number (ASN) address, and the entity for the given action includes an ASN.

In a fifth information embodiment, the action type for a given action includes loading a shared library, and the entity for the given action includes a shared library having respective name.

In a sixth information embodiment, the action type for a given action includes accessing a file, and the entity for the given action includes a file having a file name.

In a seventh information embodiment, the action type for a given action includes accessing a key in a registry, and the entity for the given action includes a registry key having a key name.

In an eighth information embodiment, the action type for a given action includes convey a system call to an operating system, and the entity for the given action includes a system call having a system call name.

In some embodiments, the host computers include first host computers that are distributed among a plurality of sources, and a set of host computers distributed among the sources includes the first host computers and additional host computers, and the method further includes normalizing the entities into normalized entities, and defining, for each one of the actions, a corresponding normalized action including the respective action type and normalized entity for the one of the actions.

In a first feature embodiment, computing given feature includes computing a count of the sources.

In a second feature embodiment, computing given feature includes computing a count of the sources including at least one host computer in the set executing a given instance of the software application.

In a third feature embodiment, for each given action type, computing a given feature includes computing a count of the host computers in the set executing a given instance of the software application that performed a given action including the given action type.

In a fourth feature embodiment, for each given action type, computing a given feature includes computing a count of the sources including at least one host computer in the set that performed a given action including the given action type.

In a fifth feature embodiment, for each given normalized action, computing a given feature includes computing a count of the sources including at least one host computer in the set that performed the given normalized action.

In a sixth feature embodiment, computing a given feature includes computing a count of distinct normalized actions.

In a seventh feature embodiment, for a given source, computing a given feature includes computing a first count of distinct normalized actions performed by instances of the software application executing on the host computers at the given source, computing respective second counts of distinct normalized actions performed by instances of the software application executing on the host computers at each of the sources other than the given source, computing an average of the second counts, and comparing the first count to the computed average.

In an eighth feature embodiment, for each given action type, computing a given feature includes computing a count of the sources having at least one host computer in the set executing a given instance of the software application that performed a given action including the given action type.

In a ninth feature embodiment, for each given normalized action, computing a given feature includes computing a count of the sources having at least one host computer in the set executing a given instance of the software application that performed the given normalized action.

In a tenth feature embodiment, for each given normalized action, computing a given feature includes computing a count of the host computers in the set executing a given instance of the software application that performed the given normalized action.

In an eleventh feature embodiment, for each given source, computing a given feature includes computing a count of the host computers in the set executing a given instance of the software application.

In a twelfth feature embodiment, for each combination including a given source and a given normalized action, computing a given feature includes computing a count of the host computers in in the given source that performed the given normalized action.

In a thirteenth feature embodiment, for each combination including a given source and a given action type, computing a given feature includes computing a count of the host computers in in the given source that performed a given normalized action including the given action type.

In a fourteenth feature embodiment, for each source, computing a given feature includes computing a count of different normalized actions performed by the software application executing on the host computers belonging to the given source.

In a fifteenth feature embodiment, for each source, computing a given feature includes computing a count of the host computers belonging to the given source.

In one embodiment, the host computers execute multiple software applications having respective names, and the method further includes normalizing the names, wherein the instances of the specific software application including the instances of the software application having identical normalized names.

In another embodiment, collecting the information for a given action performed by a given instance on a given host computer includes detecting, by an endpoint agent executing on the host computer, the given action performed by the given instance, extracting, by the endpoint agent, the information for the given action, conveying by the endpoint agent the extracted information, and receiving, by the processor, the conveyed information.

There is also provided, in accordance with an embodiment of the present invention, an apparatus including a network interface controller (NIC), and one or more processors configured to identify multiple host computers executing respective instances of a specific software application, each given instance on each given host computer including a set of program instructions loaded, by the host computer, from a respective storage device, to collect, from the host computers via the NIC, information on actions performed by the executing instances, to compute features based on the information collected from the multiple host computers, to compare the collected information for a given instance to the features so as to classify the given instance as benign or suspicious, and to generate an alert for the given instance only upon classifying the given instance as suspicious.

There is additionally provided, in accordance with an embodiment of the present invention, a computer software product, the product including a non-transitory computer-readable medium, in which program instructions are stored, which instructions, when read by a computer, cause the computer to identify multiple host computers executing respective instances of a specific software application, each given instance on each given host computer including a set of program instructions loaded, by the host computer, from a respective storage device, to collect, from the host computers, information on actions performed by the executing instances, to compute features based on the information collected from the multiple host computers, to compare the collected information for a given instance to the features so as to classify the given instance as benign or suspicious and to generate an alert for the given instance only upon classifying the given instance as suspicious.

BRIEF DESCRIPTION OF THE DRAWINGS

The disclosure is herein described, by way of example only, with reference to the accompanying drawings, wherein.

DETAILED DESCRIPTION OF EMBODIMENTS

One level of security that enterprises can employ to protect their data is to limit software applications deployed on their networks to signed software applications. However, there may be instances where malicious code is inserted into a given software application prior to the application being signed. In these instances, a vendor may distribute, to enterprise customers, signed versions of software applications that include malicious code that can be used to launch a cyberattack on a given customer. These cyberattacks are sometimes known as supply chain attacks.

Embodiments of the present invention provide methods and systems for identifying signed software applications comprising malicious code. As described hereinbelow, multiple host computers executing respective instances of a specific software application are identified, each given instance on each given host computer comprising a set of program instructions loaded, by the host computer, from a respective storage device. Information on actions performed by the executing instances is collected from the host computers, and features are computed based on the information collected from the multiple host computers. The collected information for a given instance is compared to the features so as to classify the given instance as benign or suspicious, and an alert is generated for the given instance only upon the given instance being classified as suspicious.

Since systems implementing embodiments of the present invention can monitor millions of actions performed by dozens of different software application executing on thousands of host computers deployed at hundreds of enterprises. This wealth of information enables these systems to identify anomalous (and therefore suspicious) actions performed by a given instance of a given application, even if the given application is signed.

System Description

Figure 1:
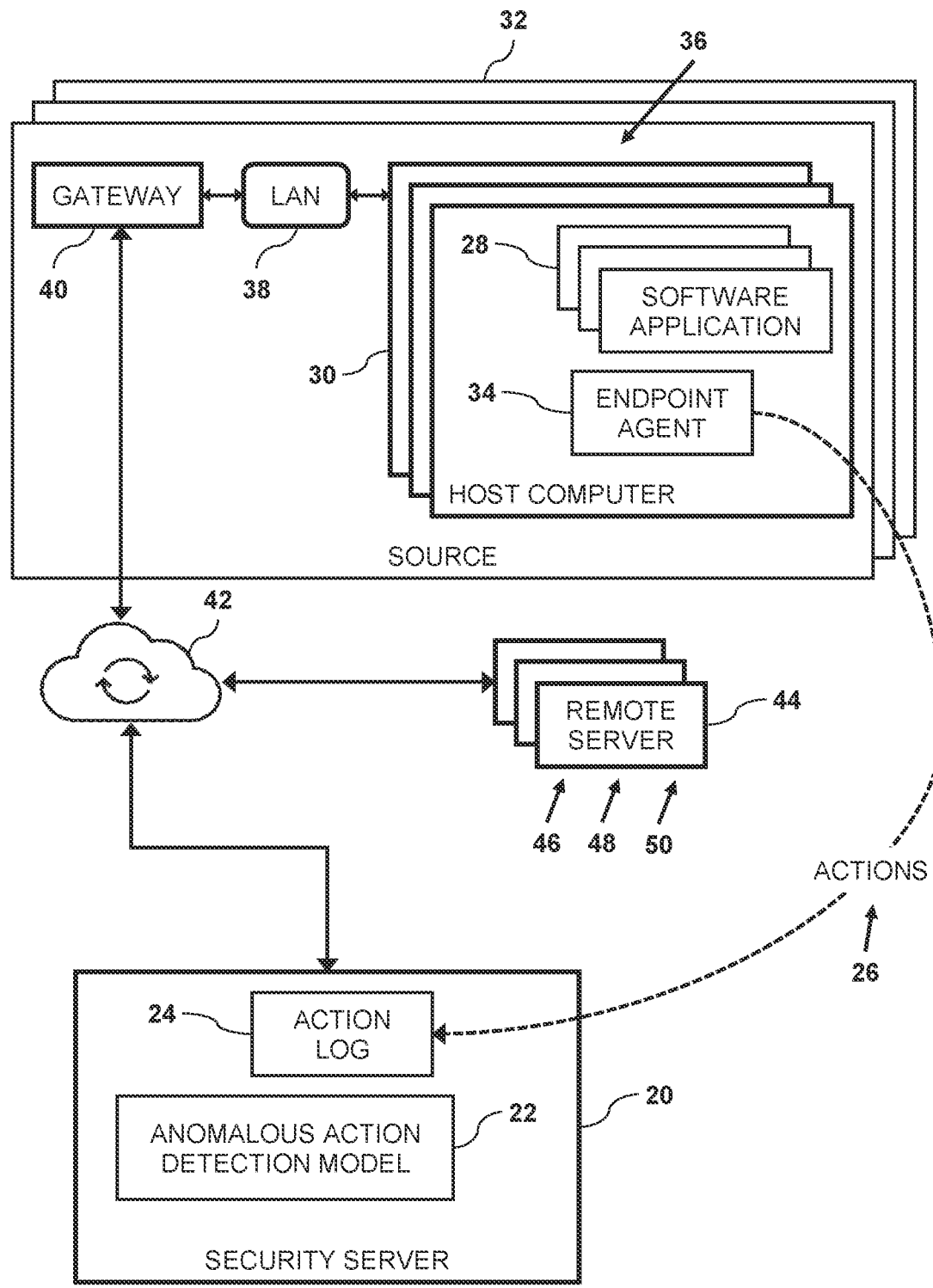
FIG. 1 is a block diagram that schematically shows a security server that is configured to train and execute a model that can be used to detect anomalous actions performed by software applications executing on host computers in multiple networks, in accordance with an embodiment of the present invention.

FIG. 1 is a block diagram that schematically shows an example of a security server 20 that is configured to train and deploy an anomalous action detection model 22, in accordance with an embodiment of the present invention. In embodiments described hereinbelow, security server 20 is configured to train model 22 by analyzing an action log 24 that stores information collected from actions 26 performed by software applications 28 executing on host computers 30 deployed in a plurality of sources 32.

In some embodiments a set of host computers 30 may comprise all host computers 30 in all sources 32. For each given software application 28, a first subset may comprise host computers (i.e., in all sources 32) executing respective instances of the given software application, and each given source 32 may have a respective second subset of the host computers comprising the host computers in the given source executing respective instances of the given software application.

In some embodiments, each given host computer 30 can execute a respective instance of an endpoint agent 34 that detects actions 26 performed by software application 28 executing on the given host computer, extracts information from each given detected action 26, and conveys the extracted information for detected actions to security server 20.

Each source 32 can be referenced by a respective source identifier (ID) 36, and may comprise an organization or an enterprise (that has a local data network such as local area network (LAN) 38 coupling the host computers (to each other and) to a gateway 40 that couples LAN 38 to a public network such as Internet 42.

In the configuration shown in FIG. 1, host computers 30 can communicate, via Internet 40 with one or more remote servers 44 (e.g., web servers, CDN server, etc.) having respective attributes such as an Internet Protocol (IP) address 46, a domain (name) 48, and an autonomous system number (ASN) 50.

Figure 2:
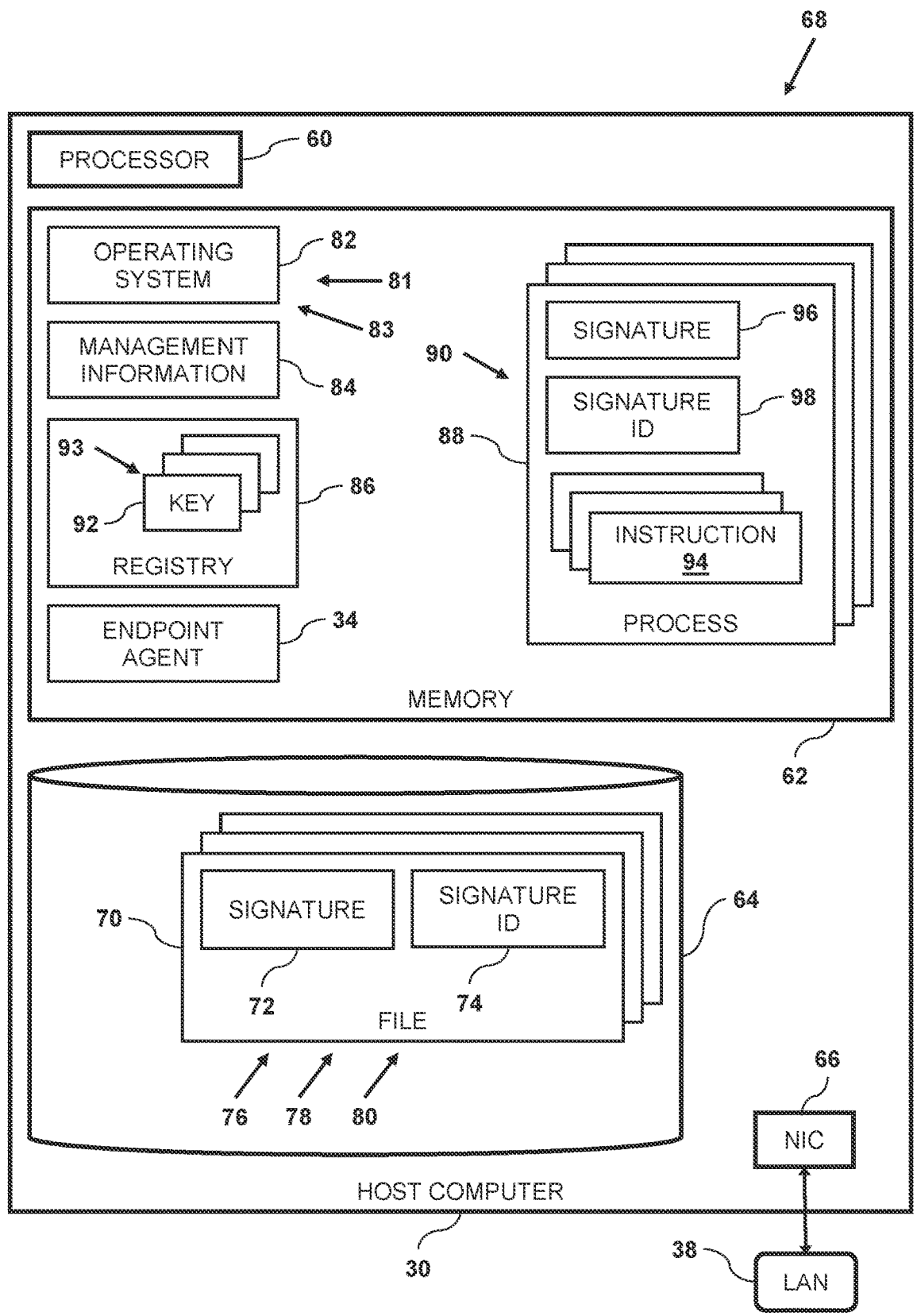
FIG. 2 is a block diagram showing an example of hardware, software and data components of a given host computer, in accordance with an embodiment of the present invention.

FIG. 2 is a block diagram showing an example of hardware, software and data components in a given host computer 30, in accordance with an embodiment of the present invention. The given host computer may comprise a host processor 60, a host memory 62, a storage device 64, and a host network interface controller (NIC) 66 that couples the given host computer to its respective LAN 38.

In some embodiments, each host computer 30 may comprise (or be assigned) a respective host ID 68. Examples of host IDs include, but are not limited to, a media access control (MAC) addresses and local IP addresses.

Storage device 64 typically stores a set of files 70. In some embodiments, a given file 70 may comprise a respective file signature 72 (e.g., a computed hash) and a respective file signature ID 74 indicating an identity of an entity that generated the respective file signature. Each given file 70 comprises a respective file name 76, a respective file size 78, and a respective file type 80. Examples of file types 80 include, but are not limited to, executable, shared library (e.g., a DLL), document, image and ZIP™ (i.e., compressed).

In embodiments herein a given file 70 having a given type 80 may be referred to by its respective type 80. For example, a given file 70 whose respective type 80 is "executable" may be referred to herein as a given executable file 70, and a given file 70 whose respective type 80 is "shared library" may be referred to herein as a given DLL file 70.

In some embodiments a given endpoint agent 34 executing on a given host computer 30 can classify the file type for a given file 70 by analyzing data that the respective host processor reads from or writes to the given file. For example, if the data comprises compressed image data, then the given endpoint agent can classify the file type as an image file type (e.g., JPG)

In the configuration shown in FIG. 2, memory 62 comprises an operating system 82, management information 84, a registry 86, endpoint agent 34, and a plurality of processes 88 having respective process names 90. In some embodiments operating system 82 may comprise a set of system calls (syscalls) 81 having respective syscall names 83. One example of operating system 82 is WINDOWS™, produced by MICROSOFT CORPORATION, Redmond, Washington USA. On example of endpoint agent 34 is CORTEX XDR™ produced by PALO ALTO NETWORKS, INC., of 3000 Tannery Way, Santa Clara, CA 95054 USA.

To manage operation of the given host computer, processor 60 can execute operating system 82. Registry 86 may comprise a database of registry keys 92 having respective key names 93 that store low-level settings for the operating system. In operation, operating system 82 can access (i.e., read from or update) keys 92 so as to manage the given host computer.

A given process 88 comprises a set of program instructions 94 that can be executed by processor 100. To start executing a given software application 28, processor 60 can load a given executable file 70 (i.e., a given file 70 whose respective file type 78 is "executable"), and start executing, as a given process, program instructions 94.

In some embodiments, a given process 88 may comprise a respective process signature 96 and a respective process signature ID 98 indicating an identity of an entity that generated the respective process signature.

Figure 3:
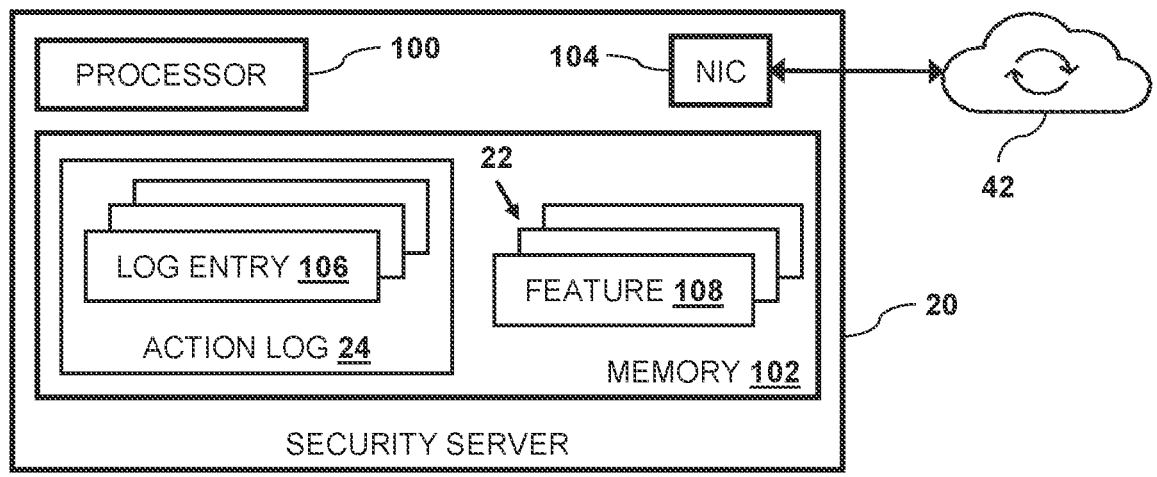
FIG. 3 is a block diagram showing an example of hardware and data components of the security server, in accordance with an embodiment of the present invention.

FIG. 3 is a block diagram showing an example of hardware and data components in security server 20, in accordance with an embodiment of the present invention. In the configuration shown in FIG. 3, security server 20 comprises a server processor 100, a server memory 102 that stores action log 24 and model 22, and a server NIC 104 that couples the security server to Internet 42.

In some embodiments, action log 24 comprises a set of log entries 106, and model 22 comprises a set of features 108. Log entries 106 are described in the description referencing FIG. 4 hereinbelow, and features 108 are described in the description referencing FIG. 5 hereinbelow.

Processors 60 and 100 comprises a general-purpose central processing units (CPU) or special-purpose embedded processors, which are programmed in software or firmware to carry out the functions described herein. This software may be downloaded to host computer(s) 30 or security server 22 in electronic form, over a network, for example. Additionally or alternatively, the software may be stored on tangible, non-transitory computer-readable media, such as optical, magnetic, or electronic memory media. Further additionally or alternatively, at least some of the functions of processors 60 and 100 may be carried out by hard-wired or programmable digital logic circuits.

Examples of memories 62, 102 and storage device 64 include dynamic random-access memories, non-volatile random-access memories, hard disk drives and solid-state disk drives.

In some embodiments, tasks described herein performed by processors 60 and 90 may be split among multiple physical and/or virtual computing devices. In other embodiments, these tasks may be performed in a managed cloud service.

Figure 4:
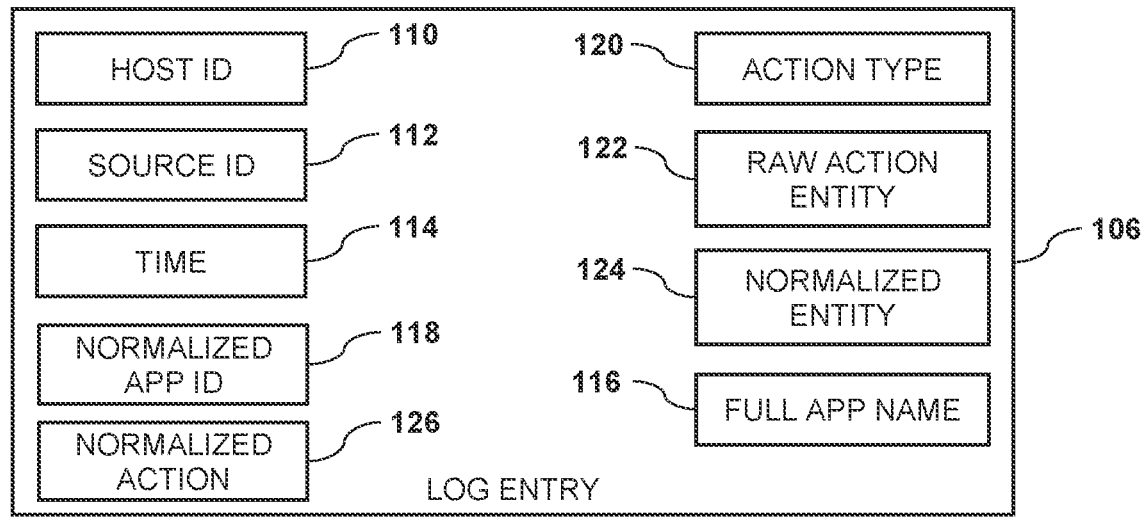
FIG. 4 is a block diagram showing an example of data components that the security server can store in an action log, in accordance with an embodiment of the present invention.

FIG. 4 is a block diagram showing an example of data that processor 100 can store in a given log entry 106, in accordance with an embodiment of the present invention. In embodiments herein, log entries 106 have a one-to-one correspondence with actions 26, and upon receiving, from a given endpoint agent 34 executing on a given host computer 39, information for a new given action 26, processor 100 can add a new log entry 106, and populate the new log entry with information such as:

A host ID 110. Processor can 100 store, to host ID 110, host ID 68 of the given host computer.

A source ID 112. As described supra, the given host computer 30 is deployed in a given source 32. Processor 100 can store, to source ID 112, source ID 36 of the given source.

A time 114. Processor 100 can store, to time 114, the date and time of the given action.

A full application name 116. In embodiments where program instructions 94 of a given software application 28 performed the given action, processor 100 can store, to full application name 116, a file name 76 for the executable file storing the program instructions.

A normalized application ID 118. Using embodiments described in the description referencing FIG. 6 hereinbelow, processor 100 can derive the normalized application ID for full application name 116.

An action type 120. The following are examples of action types 120 that processor 100 can store to the new log entry in response to receiving the information for a given action:

- Process creation. A given software application 28 executing on the given host computer created a new process 88.
- Domain access. A given software application executing on the given host computer accessed a given domain 48.
- IP address access. A given software application 28 executing on the given host computer accessed a given IP address 46.
- ASN access. A given software application 28 executing on the given host computer accessed a given IP address 46 belonging to a given ASN 50.
- Module load. A given software application 28 executing on the given host computer loads a shared library such as a given DLL file 70.
- Process injection. A given software application 28 executing on the given host computer may inject a new process 88.
- File access. A given software application 28 executing on the given host computer may create, read from, write to, or delete a given file 70.
- Registry access. A given software application 28 executing on the given host computer may access a given registry key 92 in registry 86.
- Syscall. A given software application 28 executing on the given host computer may convey a given system call 81 (e.g., GetClipboardData) to operating system 82.
- A remote procedure call (RPC). A given software application 28 executing on the given host computer may convey an RPC. An example of an RPC is described in the description referencing FIG. 6 hereinbelow.

A raw action entity 122. Processor 100 can store, to raw action entity 122, an "entity name" on which the given action was performed by a given software application 28. For example:

- If action type 120 is process creation or process injection, then processor 100 can store, to raw action entity 122, a the process name of the process that was created/injected by the given action.
- If action type 120 is domain access, then processor 100 can store, to raw action entity 122, the domain name that was accessed by the given action.
- If action type 120 is IP address access, then processor 100 can store, to raw action entity 122, the IP address that was accessed by the given action.
- If action type 120 is ASN access, then processor 100 can store, to raw action entity 122, the ASN of the IP address that was accessed by the given action.
- If action type 120 is module load, then processor 100 can store, to raw action entity 122, the file name of the DLL (i.e., shared library) file that was loaded by the given action.
- If action type 120 is file access, then processor 100 can store, to raw action entity 122, the file name of the file that was accessed by the given action.
- If action type 120 is registry access, then processor 100 can store, to raw action entity 122, a name/ID of the registry key that was loaded by the given action.
- If action type 120 is syscall, then processor 100 can store, to raw action entity 122, the syscall name system call that was called by the given action.
- If action type 120 is management system access (e.g., accessing settings in operating system 82, then processor 100 can store, to raw action entity 122, a query for settings in management information 84.

A normalized action entity 124. Using embodiments described in the description referencing FIG. 6 hereinbelow, processor 100 can derive the normalized action entity for raw action entity 122.

A normalized action 126 comprising a combination of action type 120 and normalized action entity 124.

Figure 5:
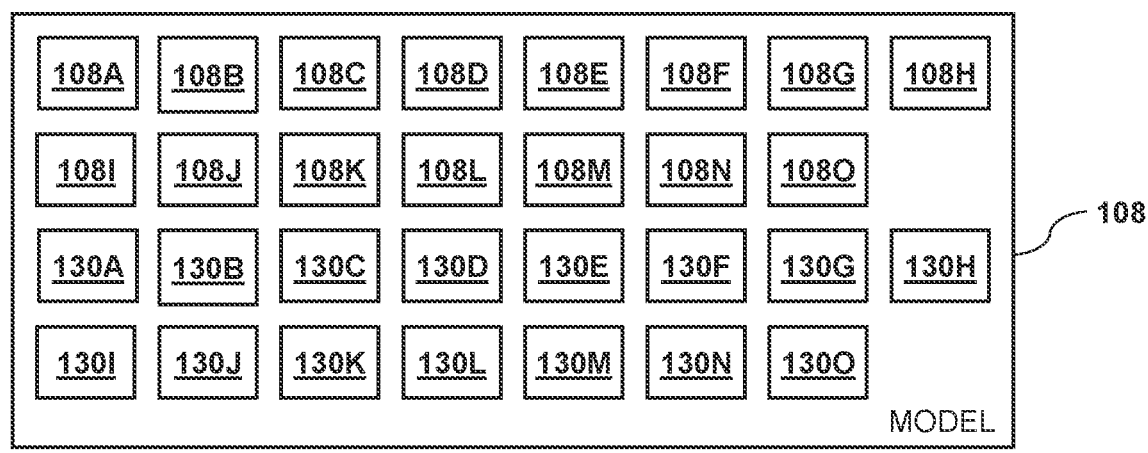
FIG. 5 is a block diagram showing an example of the model, in accordance with an embodiment of the present invention.

FIG. 5 is a block diagram showing an example of data components that the security server can store in model 22, in accordance with an embodiment of the present invention. In addition to the set of features 108, model 22 also comprises a set of weights 130 having a one-to-one correspondence with the features. In FIG. 5, features 108 and weights 130 can be differentiated by appending a letter to the identifying numeral, so that the features comprise features 108A-108O, and the weights comprises 130A-130O

In embodiments herein, processor 100 computes, for each given software application 28, features 108 that reflect respective metrics of the actions performed by the given software application. Additionally, the features may comprise:

Features 108 whose respective feature types (not shown) are "global" (these features 108 are referred to herein as global features 108). In some embodiments, processor 100 can compute global features 108 by analyzing all log entries 106.

Features 108 whose respective feature types comprise a given source ID 36 (these features 108 are referred to herein as local features 108). In some embodiments, processor 100 can compute local features 108 by analyzing the log entries 106 whose respective source ID 112 matches the given source ID 36.

Examples of global features 108 that processor 100 can compute, based on log entries 106, include:

Feature 108A: Processor 100 can compute a count of distinct (i.e., different) source IDs 110 (i.e., referencing respective sources 32).

Features 108B: For each given normalized application ID 118, processor 100 can compute a respective feature 108B comprising a count of distinct sources 32 in the log entries whose respective normalized application IDs 118 match the given normalized application ID 118.

Features 108C: For each combination comprising a given normalized application ID 118 and a given normalized action 126, processor 100 can compute a respective feature 108C comprising a count of distinct host IDs 110 (i.e., referencing respective host computers 30).

Features 108D: For each action type 120, processor 100 can compute a respective feature 108D comprising a count of distinct source IDs 110.

Features 108E: For each normalized action 126, processor 100 can compute a respective feature 108D comprising a count of distinct source IDs 110.

Features 108F: For each given normalized application ID 118, processor 100 can compute a respective feature 108F comprising a count of distinct normalized actions 126 (i.e., performed by software applications 28 referenced by the given normalized application ID).

In some embodiments, processor 100 can compute features 108F only for normalized actions 126 that were performed (i.e., as indicated by log entries 106) by at least a specified number (e.g., five) of distinct source IDs 112.

Features 108G: For each combination comprising a given normalized application ID 118 and a given action type 120, processor 100 can compute a respective feature 108G comprising a count of distinct source IDs 110.

Features 108H: For each combination comprising a given normalized application ID 118 and a given normalized action 126, processor 100 can compute a respective feature 108H comprising a count of distinct source IDs 110.

Features 108I: For each combination comprising a given combination comprising a given normalized application ID 118 and a given normalized action 126, processor 100 can compute a respective feature 108I comprising a count of distinct host IDs 110.

Examples of local features 108 that processor 100 can compute, based on log entries 106, include:

Features 108J: For each combination comprising a given distinct source ID 110 and a given normalized application ID 118, processor 100 can compute a respective feature 108I comprising a count of host IDs 110 (i.e., host computers 30) comprising the software application corresponding to the given normalized application ID. In some embodiments, processor 100 can include a given host computer 30 in the count only if the given computer executed the software application (i.e., corresponding to the given normalized application ID) within a specified time period (e.g., the previous 30 days).

Features 108K: For each combination comprising a given distinct source ID 110 and a given normalized action 126, processor 100 can compute respective feature 108J comprising a count of host IDs 110 (i.e., referencing respective host computers 30) that performed the given normalized action.

Features 108L: For each combination given distinct source 32 and a given action type 120, processor 100 can compute a respective feature 108K comprising a count of host IDs 110 that performed the given action type.

Features 108M: For each combination comprising a given distinct source ID 110 and a given normalized application ID 118, processor 100 can compute a respective feature 108L comprising a count of distinct normalized actions 126.

Features 108N: For each given distinct source ID 110, processor 100 can compute a respective feature 108M comprising a count of host IDs 110 (i.e., host computers 30) belonging to (i.e., deployed within) the given source.

In addition to global and local features 108 described hereinabove, features 108 may comprise feature 108O that is a hybrid (i.e., global/local). For each combination comprising a given distinct source ID 110 and a distinct normalized application ID 118 (i.e., referencing a given software application 28 executing on one or more of the host computers at a given source 32), processor 100 can compute a respective count of distinct normalized actions 126 (i.e., performed by the given software application on a given host computer 30 at the given source). For each given computed count, processor 100 can compute a respective feature 108O by averaging all the computed counts other the given computed count, and then comparing the given computed count to the computed average. This can be referred to as "computing the global profiles over the local profiles". For example:

Reference the computed counts as local_distinct_actions.

For each distinct normalized application ID 118, processor 100 computes the following:

AVG(local_distinct_actions)

STDDEV(local_distinct_actions) (i.e., relative to all the other source IDs)

For each distinct source ID 110, processor 100 computes:

$$z\text{-score}=(\text{local\_distinct\_actions})-\text{AVG}(\text{local\_distinct\_actions}))/\text{STDDEV}(\text{local\_distinct\_actions})$$

The z-score represents how many standard deviations the local_distinct_actions is greater than AVG(local_distinct_actions).

In features 108A-108O described hereinabove, processor 100 performs the counts by counting the number of log entries 106 matching the specified conditions. For example, in Features 108N, the specified conditions comprise combinations of the distinct sources and the normalized application IDs.

As described hereinbelow, processor 100 can compute a score for each action based on the features generated for the action. In the features described hereinabove:

For features 108C-M, lower values are more suspicious than higher values. For feature 108O, lower values are less suspicious that higher values.

In some embodiments, processor 100 can compute, for each feature 108C-M and 108O, values between 0-1, where values closer to 0 are more suspicious and values closer to 1 are less suspicious.

Processor 100 can use feature 108B to provide context to features 108C-M and 108O. For example, if feature 108B is a low number (e.g., less the 5% of the sources), then processor 100 can use feature 108B to reduce suspiciousness of features 108C-M and 108O.

Processor 100 can use features 108A and 108N to "normalize" the other features 108 (e.g., into the 0-1 range described supra). For example, if feature 108D is 700, and feature 108A is 1000, then processor 100 can compute a normalized value for feature 108D as:

Normalized 108$D$=700/1000=0.7

Model Training and Deployment

Figure 6:
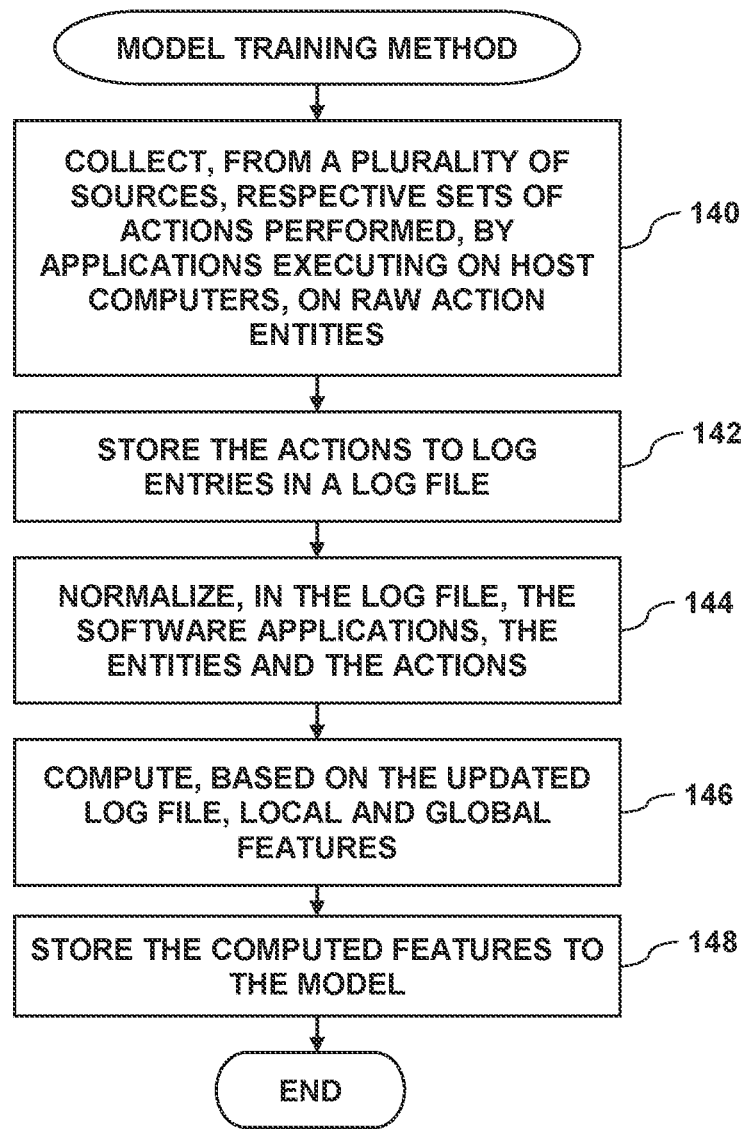
FIG. 6 is a flow diagram that schematically illustrates a method of training the model on a set of training data, in accordance with an embodiment of the present invention.

FIG. 6 is a flow diagram that schematically illustrates a method of training model 22 on a set of training data, in accordance with an embodiment of the present invention. In embodiments described herein the training data comprises action log 24.

In step 140, processor 100 collects, from multiple endpoint agents 34 respectively executing in host computers 30 deployed in multiple sources 32, respective sets of actions 26 performed, by software applications executing on the host computers, on respective raw action entities 122.

In step 142, using embodiments described hereinabove, processor stores information from the collected actions to respective log entries 106 in action log 24.

In step 144, processor 100 normalizes, in log entries 106, raw entities 122 into normalized entities 124, actions 26 into normalized actions 126, and names 116 of software applications 28 into normalized application IDs 118. As described supra, normalized actions 126 comprise respective combinations of action types 120 and normalized action entities.

Different instances of a given software application 28 may have different names 116 that reflect different builds or versions. In a software application normalization embodiment, processor 100 can normalize application names 116 by removing unnecessary information so as to determine a common normalized application ID 118 across all the instances. For example, processor 100 can normalize any of the following full application names 116

Company-App-Agent-x86_64-7.12.0-15.exe
Company-App-Agent-x86_64-7.13.0-15.exe
Company-App-Agent-x86_64-7.12.0-16.exe
into
companyappagent
and store companyappagent to normalized application ID 118.

In one embodiment, if the executable file for the given software application comprises a respective file signature 72, then processor 100 can normalize the application name of the given software application by concatenating the vendor's name (i.e., the vendor the provided or produced the given software application) to the respective normalized application ID 118. In an additional embodiment, processor 100 can normalize the given software application by computing a hash value for the executable file 70 of the given software application.

In a process normalization embodiment, if a given action type 120 comprises process creation or process injection comprising a new process 88 having a given process name 90, processor 100 can normalize the process name by removing any unnecessary information in the name. In some embodiments, if the given process comprises a respective process signature 96, then processor 100 can normalize the process name by adding the respective process signature ID 98 to the respective normalized entity 124.

In a domain normalization embodiment, a given action type 120 comprises domain access to a given domain 48. In this embodiment, processor 100 can split each domain 48 into three sections. For example, the domain "a.b.c.site.com" can be split into:

A public suffix ".com"
A main domain "site", and
A sub-domain "a.b.c"

Since the subdomain is usually attacker-controlled, processor 100 can perform this normalization based on main domain concatenated with the public suffix (i.e., "site.com").

In an ASN normalization embodiment, a given action type 120 comprises an access to a given IP address 46. If processor 100 can map the given IP address to a given ASN 50 comprising a geolocation, then the server processor can normalize the given IP address to the geolocation.

In a file normalization embodiment, a given action type 120 comprises file access of a given file 70. In one file normalization embodiment, processor 100 can use embodiments in the software application and the process normalization embodiments described hereinabove to normalize the given file by removing any unnecessary information from the respective file name 76. In other file normalization embodiments, processor 100 can use the respective file size 80 and/or the respective file type 78 to normalize the given file.

In an RPC normalization embodiment, a given action type 120 comprises an RPC call. For example, the WINDOWS™ operating system has uses WINDOWS MANAGEMENT INSTRUMENTATION™ (WMI™) queries to query system data. WMI™ queries can be used by both legitimate applications and attackers, and the queries can be divided into three sections—SELECT, FROM and WHERE. Since the WHERE section usually contain redundant information, processor 100 can normalize the query by only using the SELECT and the FROM sections.

For example, processor 100 can use this embodiment to normalize the following WMI™ query:

SELECT ParentProcessId FROM win32_process
WHERE ProcessId='16236
to
SELECT ParentProcessId FROM win32_process In registry normalization embodiments, a given action type 120 comprises a registry access to a given key 92 having a given path. In a one registry normalization embodiment, processor 100 can normalize the registry access by removing any redundant and randomized information in the path.

Some groups of registry keys 92 groups tend to be used for malicious activity more often than others. In another registry normalization embodiment, processor 100 can assign respective identifiers to each of the groups (i.e., the identifiers indicating whether or not the respective groups tend to be used for malicious activity), and use the identifiers for normalization.

In a syscall normalization embodiment, if a given action type 120 comprises syscall, then processor 100 can normalize syscall 81 to syscall name 83 (i.e., without any parameters in syscall 81).

Returning to the flow diagram, in step 146, using embodiments described hereinabove, processor 100 analyzes action log 24 (now comprising normalized application IDs 118, normalized entities 124 and normalized actions 126) so as to compute local and global features 108. In embodiments herein, action log 24 comprises information (e.g., host ID 110, source ID 112, time 114, full application name 116, action type 120, and raw action entity 122) that processor 100 collects from host computers 30, as well as information normalized by the server processor (e.g., normalized application name 118, normalized action entity 124, and normalized action 126).

In step 148, processor 100 stores the computed local and global features to model 22, and the method ends.

Figure 7:
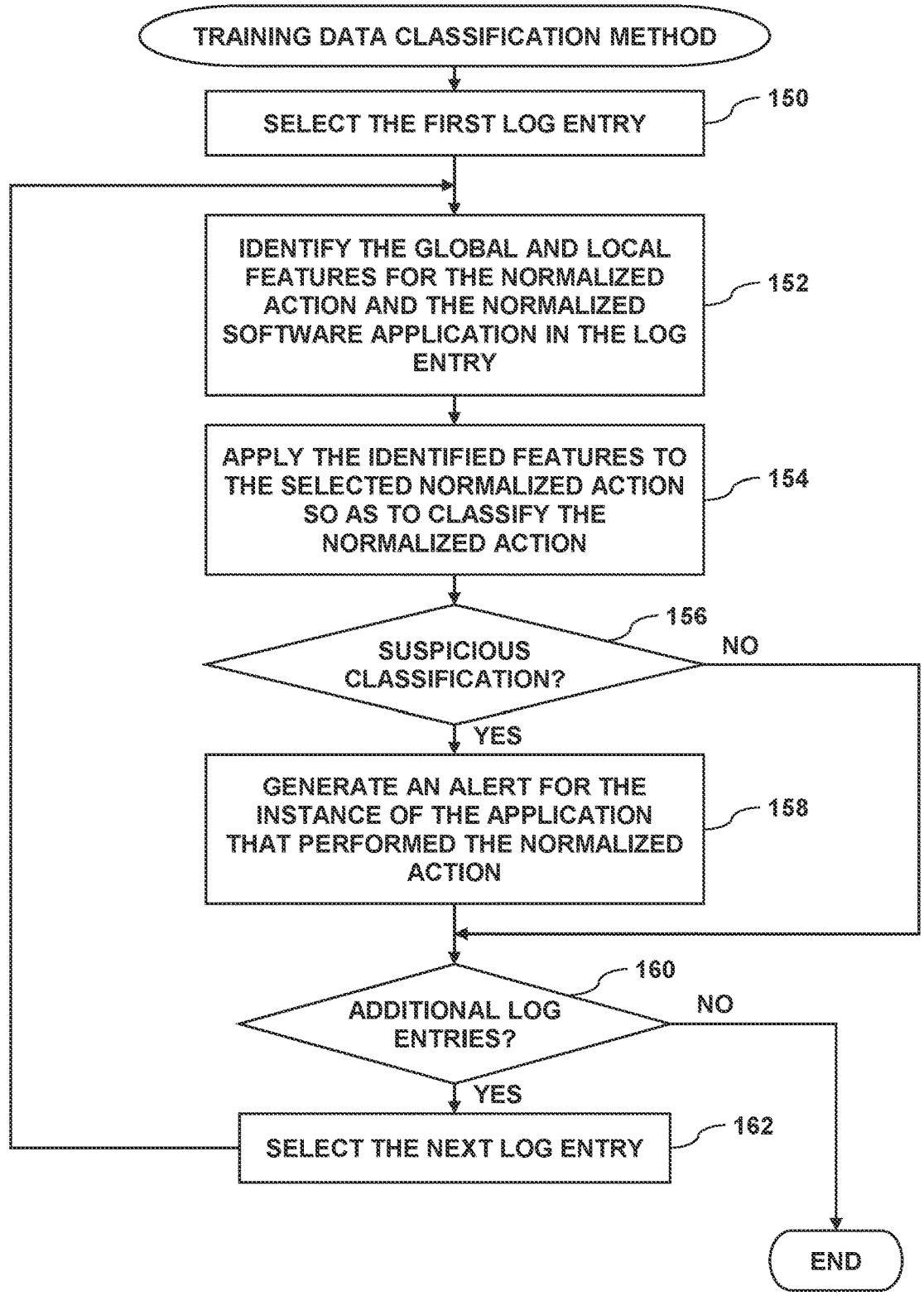
FIG. 7 is a flow diagram that schematically illustrates a method of using the model to classify actions in the training data, in accordance with an embodiment of the present invention.

FIG. 7 is a flow diagram that schematically illustrates a method of using the model to classify normalized actions 126 in action log 24, in accordance with an embodiment of the present invention.

In step 150, processor 100 selects the first log entry 106 in action log 24. The selected log entry comprises a given normalized application ID 118 and a given normalized action 126.

In step 152, processor 100 identifies a set of local and global features 108 that the server processor can use to analyze the given normalized action. When analyzing normalized actions 126 in log entries 106, processor 100 may use:

One or more first given features 108 (e.g., feature 108A) for all the normalized actions.
One or more second given features 108 (e.g., feature 108B) based solely on the given normalized application ID.
One or more third given features 108 (e.g., feature 108L) based solely on the given normalized action.
One or more fourth given features 108 (e.g., feature 108C) based on a combination of the given normalized application ID and the given normalized action.

In step 154, processor 100 applies the identified features to the given normalized action so as to classify the given normalized action as either benign or suspicious. In the following example, processor 100 can compute a score based on the identified features, and determine the classification based on the computed score. In this example, the scores range from 0-1 lower scores are more suspicious, and processor 100 can set a threshold to determine the classification (e.g., scores below 0.3 can indicate that the given normalized action is suspicious, and scores 0.3 and greater can indicate that the given normalized action is benign).

In order for the score to not be affected by insignificant factors (e.g., the number of different sources 32, the number of different host computers 30, and the number of different software applications 28), processor 100 can normalize each identified feature 108 so as to normalize the identified features in a [0, 1] range. For example, processor 100 can perform the following steps:

Divide each feature ($F_i$) (i.e., features 108) by its "maximum value" ($M_i$) to get the normalized feature
Log both the numerator and denominator to scale down large numbers.
Round down the result of the log in order to bin the data so as to avoid overfitting and to stabilize the result.
Compute a weighted average on the normalized features to come up with a single score. Each feature has a different weight (Wi) value (i.e., weights 130) where:

$$\sum_{i=1}^{n} W_i = 1$$

Compute a score $$\text{score} = W_1 \cdot \frac{\text{int}(\log_2(F_1))}{\text{int}(\log_2(M_1))} + W_2 \cdot \frac{\text{in}(\log_2(F_2))}{\text{int}(\log_2(M_2))} + \cdots + W_n$$

In some embodiments, computing the score enables processor 100 to compare action normalized action to the identified features, so as classify the normalized action as either benign or anomalous and therefore suspicious.

In step 156, if processor 100 classified (i.e., using embodiments described hereinabove) the given normalized action as suspicious, then in step 158, the server processor can generate an alert for the instance of the software application corresponding to the given normalized application ID. For example, the alert may comprise a notification to a systems administrator to investigate the given normalized action.

In step 160, processor 100 determines if there are any non-selected log entries 106 in action log 24. If there are any non-selected log entries 106 in action log 24, then in step 162, processor 100 selects the next log entries 106 in the action log, and the method ends.

Returning to step 160, if there are no non-selected log entries 106 in action log 24, then the method ends.

Returning to step 156, if processor 100 classified the given normalized action as benign, then the method continues with step 162.

Figure 8:
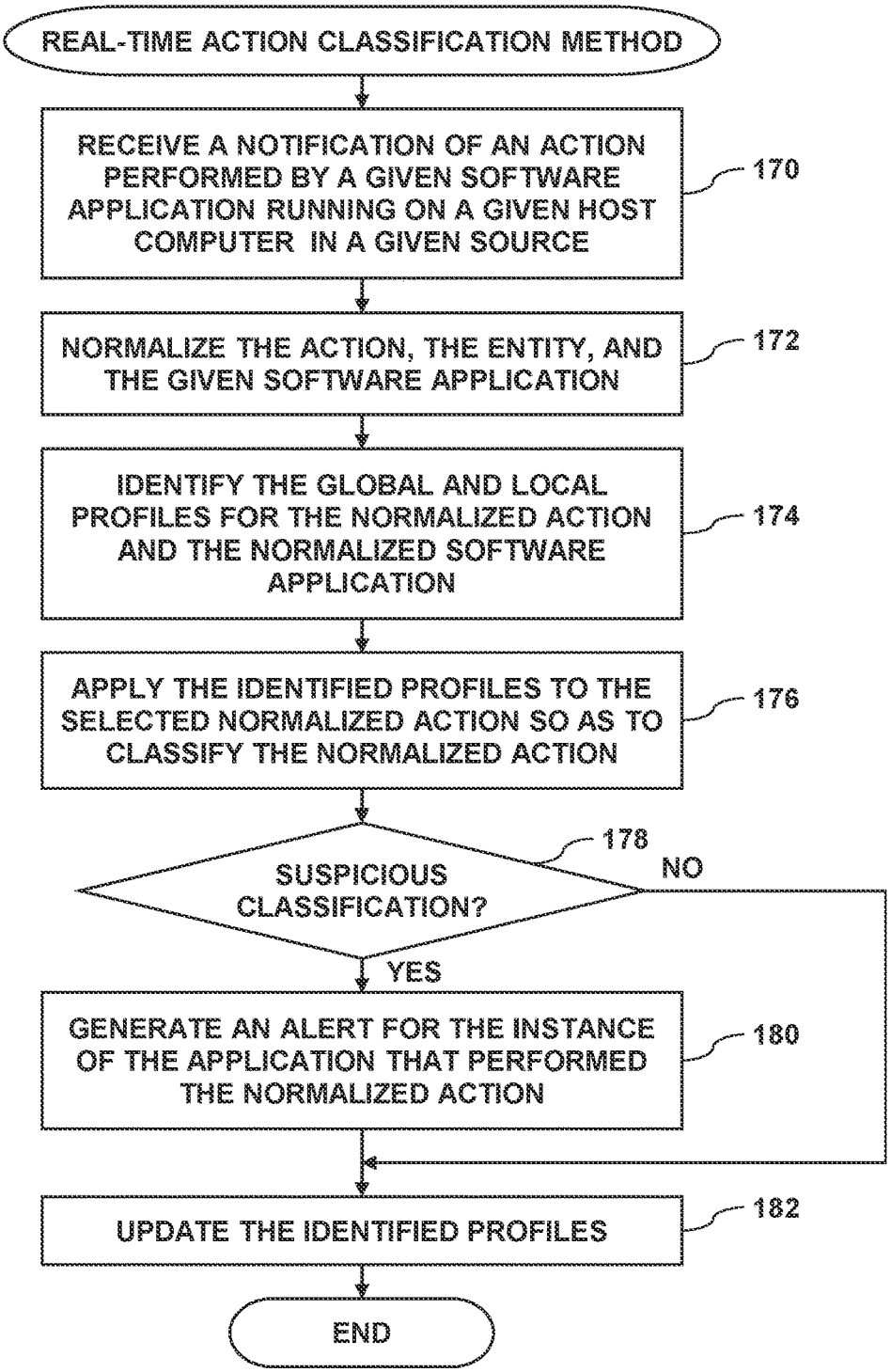
FIG. 8 is a flow diagram that schematically illustrates a method of using the model to classify, in real-time, actions performed by the software applications, in accordance with an embodiment of the present invention.

FIG. 8 is a flow diagram that schematically illustrates a method of using the model to perform real-time classification of actions 26, in accordance with an embodiment of the present invention.

In step 170, processor 100 receives, from a given endpoint agent 34 executing on a given host computer 30, information a new action 26 performed on a given raw action entity 122 by a given software application 28.

In step 172, using embodiments described supra, processor 100 creates a new log entry 106, and populates the new log entry with host ID 110, source ID 112, time 114, full application name 116, normalized application ID 118, action type 120, raw action entity 122, normalized entity 124, and normalized action 126.

In step 174, processor 100 uses embodiments described hereinabove to identify a set of local and global features 108 that the server processor can use to analyze the new normalized action.

In step 176, processor 100 uses embodiments described supra for applying the identified features to the new normalized action so as to classify the new normalized action as either benign or suspicious.

In step 178, if processor 100 classified the new normalized action as suspicious, then in step 180, the server processor can generate an alert for the instance of the software application corresponding to the new normalized application ID.

In step 182, processor 100 updates features 108 with the information in the new log entry, and the method ends. In some embodiments, processor 100 can periodically (e.g., once every 24 hours) update features 108 with the information in new log entries 106 (i.e., since the previous update).

Returning to step 178, if processor 100 classified the new normalized action as benign, then the method continues with step 182.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method, comprising:
    identifying multiple host computers executing respective instances of a specific software application, each given instance on each given host computer comprising a set of program instructions loaded, by the host computer, from a respective storage device;
    collecting, from the host computers, information on actions performed by the executing instances, the information comprising action types and entities;
    computing features based on the information collected from the multiple host computers;
    comparing, by a processor, the collected information for a given instance to the features so as to classify the given instance as benign or suspicious; and
    generating an alert for the given instance only upon classifying the given instance as suspicious,
    wherein the host computers comprise first host computers that are distributed among a plurality of sources, and wherein a set of host computers distributed among the sources comprises the first host computers and additional host computers, and
    further comprising normalizing the entities into normalized entities, and defining, for each one of the actions, a corresponding normalized action comprising the respective action type and normalized entity for the one of the actions.

2. The method according to claim 1, wherein the action type for a given action comprises creating or injecting a process, and wherein the entity for the given action comprises a process having a process name.

3. The method according to claim 1, wherein the action type for a given action comprises accessing a domain, and wherein the entity for the given action comprises a domain name.

4. The method according to claim 1, wherein the action type for a given action comprises accessing an Internet Protocol (IP) address, and wherein the entity for the given action comprises an IP address.

5. The method according to claim 1, wherein the action type for a given action comprises accessing an autonomous system number (ASN) address, and wherein the entity for the given action comprises an ASN.

6. The method according to claim 1, wherein the action type for a given action comprises loading a shared library, and wherein the entity for the given action comprises a shared library having respective name.

7. The method according to claim 1, wherein the action type for a given action comprises accessing a file, and wherein the entity for the given action comprises a file having a file name.

8. The method according to claim 1, wherein the action type for a given action comprises accessing a key in a registry, and wherein the entity for the given action comprises a registry key having a key name.

9. The method according to claim 1, wherein the action type for a given action comprises convey a system call to an operating system, and wherein the entity for the given action comprises a system call having a system call name.

10. The method according to claim 1, wherein computing given feature comprises computing a count of the sources.

11. The method according to claim 1, wherein computing given feature comprises computing a count of the sources comprising at least one host computer in the set executing a given instance of the software application.

12. The method according to claim 1, wherein for each given action type, computing a given feature comprises computing a count of the host computers in the set executing a given instance of the software application that performed a given action comprising the given action type.

13. The method according to claim 1, wherein for each given action type, computing a given feature comprises computing a count of the sources comprising at least one host computer in the set that performed a given action comprising the given action type.

14. The method according to claim 1, wherein for each given normalized action, computing a given feature comprises computing a count of the sources comprising at least one host computer in the set that performed the given normalized action.

15. The method according to claim 1, wherein computing a given feature comprises computing a count of distinct normalized actions.

16. The method according to claim 1, wherein for a given source, computing a given feature comprises computing a first count of distinct normalized actions performed by instances of the software application executing on the host computers at the given source, computing respective second counts of distinct normalized actions performed by instances of the software application executing on the host computers at each of the sources other than the given source, computing an average of the second counts, and comparing the first count to the computed average.

17. The method according to claim 1, wherein for each given action type, computing a given feature comprises computing a count of the sources having at least one host computer in the set executing a given instance of the software application that performed a given action comprising the given action type.

18. The method according to claim 1, wherein for each given normalized action, computing a given feature comprises computing a count of the sources having at least one host computer in the set executing a given instance of the software application that performed the given normalized action.

19. The method according to claim 1, wherein for each given normalized action, computing a given feature comprises computing a count of the host computers in the set executing a given instance of the software application that performed the given normalized action.

20. The method according to claim 1, wherein for each given source, computing a given feature comprises computing a count of the host computers in the set executing a given instance of the software application.

21. The method according to claim 1, wherein for each combination comprising a given source and a given normalized action, computing a given feature comprises computing a count of the host computers in in the given source that performed the given normalized action.

22. The method according to claim 1, wherein for each combination comprising a given source and a given action type, computing a given feature comprises computing a count of the host computers in in the given source that performed a given normalized action comprising the given action type.

23. The method according to claim 1, wherein for each source, computing a given feature comprises computing a count of different normalized actions performed by the software application executing on the host computers belonging to the given source.

24. The method according to claim 1, wherein for each source, computing a given feature comprises computing a count of the host computers belonging to the given source.

25. The method according to claim 1, wherein the host computers execute multiple software applications having respective names, and further comprising normalizing the names, wherein the instances of the specific software application comprising the instances of the software application having identical normalized names.

26. The method according to claim 1, wherein collecting the information for a given action performed by a given instance on a given host computer comprises detecting, by an endpoint agent executing on the host computer, the given action performed by the given instance, extracting, by the endpoint agent, the information for the given action, conveying by the endpoint agent the extracted information, and receiving, by the processor, the conveyed information.

27. An apparatus, comprising:
a network interface controller (NIC); and
one or more hardware processors configured:
to identify multiple host computers executing respective instances of a specific software application, each given instance on each given host computer comprising a set of program instructions loaded, by the host computer, from a respective storage device,
to collect, from the host computers via the NIC, information on actions performed by the executing instances, the information comprising action types and entities,
to compute features based on the information collected from the multiple host computers,
to compare the collected information for a given instance to the features so as to classify the given instance as benign or suspicious, and
to generate an alert for the given instance only upon classifying the given instance as suspicious,
wherein the host computers comprise first host computers that are distributed among a plurality of sources, and wherein a set of host computers distributed among the sources comprises the first host computers and additional host computers, and
wherein the one or more hardware processors are further configured to normalize the entities into normalized entities, and to define, for each one of the actions, a corresponding normalized action comprising the respective action type and normalized entity for the one of the actions.

28. A computer software product, the product comprising a non-transitory computer-readable medium, in which program instructions are stored, which instructions, when read by a computer, cause the computer:
to identify multiple host computers executing respective instances of a specific software application, each given instance on each given host computer comprising a set of program instructions loaded, by the host computer, from a respective storage device;
to collect, from the host computers, information on actions performed by the executing instances, the information comprising action types and entities;
to compute features based on the information collected from the multiple host computers;
to compare the collected information for a given instance to the features so as to classify the given instance as benign or suspicious; and
to generate an alert for the given instance only upon classifying the given instance as suspicious,
wherein the host computers comprise first host computers that are distributed among a plurality of sources, and wherein a set of host computers distributed among the sources comprises the first host computers and additional host computers, and
wherein the instructions cause the computer to normalize the entities into normalized entities, and to define, for each one of the actions, a corresponding normalized action comprising the respective action type and normalized entity for the one of the actions.

\* \* \* \* \*